June 20, 1967  J. J. SHELTON  3,326,435
OFFSET PIVOTED WEB GUIDING APPARATUS
Filed Sept. 27, 1965  3 Sheets-Sheet 3

INVENTOR.
JOHN J. SHELTON
BY
Dunlap and Laney
ATTORNEYS

3,326,435
OFFSET PIVOTED WEB GUIDING APPARATUS
John J. Shelton, Stillwater, Okla., assignor to Fife Manufacturing Company, Inc., Oklahoma City, Okla., a corporation of Oklahoma
Filed Sept. 27, 1965, Ser. No. 490,407
20 Claims. (Cl. 226—22)

This invention relates to apparatus for maintaining the alignment of an elongated web or sheet of flexible material along a desired path of travel as such sheet moves between points of origin and destination which are widely separated from each other. More particularly, the present invention relates to web guiding apparatus employing a guide roller or rollers which are swiveled or pivoted about an instantaneous center of rotation, or so-called instant center, which is adjacent the first guide roller contacted by the moving web so that alignment of the web with a predetermined path of travel is accomplished by so-called displacement guiding. The type of guiding apparatus utilized is an offset pivoted web guide, using a slider-crank type kinematic linkage for effecting the corrective movement of the guide rollers.

In web guiding devices of the type having guide rollers contacting in a transverse direction the entire span of a web which is to be guided, it has heretofore been the practice to drive the roller or rollers in pivoting or swiveling motion for the correction of misalignment of the web passed thereover, with such pivoting movement being effected in one of several ways. In Fife United States Patent 2,797,091, the ends of the roller or rollers are slidably journaled on a pair of spaced, diverging rods, and movement of the rollers along the rods causes the rollers to swivel or be canted so as to effect correction of misalignment of the web. In this type of guiding device, the roller is moved bodily in a transverse direction and is simultaneously canted or swiveled. The instant center, or instantaneous center or rotation, in the case of this type of web guiding apparatus, is located a substantial distance, usually at least one web span width, along the entering span from the first guide roller.

In Fife United States Patent 3,104,789, a cantilevered type guide roller or pair of guide rollers is utilized for guiding webs, and these rollers are swiveled or pivoted about a pivotal axis which is offset from the rollers by a substantial distance. The pivotal axis of the roller or rollers (not their rotational axis) is indicated by the patent to preferably extend parallel to the bisector of the angle formed by the spans or portions of the web which approach and leave the guide roller or rollers.

In the described web guiding or aligning devices, the corrective shifting of the web to move it to a desired path of movement from a position of misalignment is effected by the pivotation of the rollers in a way which moves the rollers bodily to varying extents along the width of the web more in one direction than the other, rather than merely pivoting the roller about an axis which passes through the center of the web in a direction parallel to, or coplanar with, the incoming web span. This type of motion by the guide rollers, which may be termed a steering type guiding motion, tends to stress or stretch the web, and results, in the case of some types of webs, in a tendency to wrinkle or, in a few instances, to tear the web. The stress imparted to the web and the chances of damaging the web which result from such stressing are increased as the length of the incoming span between the initially encountered guide roller and the last preceding idler roller or the point of origin of the web, as the case may be, is decreased.

The present invention provides an improved web guiding apparatus of the type employing a single or pair of guide rollers which are caused to move, in accomplishing their corrective or aligning function, about an instant center lying in a pivotal axis which extends approximately parallel to, or preferably is coplanar with, the plane occupied by the incoming span of the web as it approaches the initial guide roller. The pivotal axis of the guide rollers can actually extend at an angle to the plane containing the incoming span, but departures from parallelism to the plane preferably should not exceed 20°. Defined in another way, the instant center-containing pivotal axis of the guide rollers preferably extends normal to the plane or planes of swiveling or swinging movement of the rotational axes of the guide roller or rollers, but in any event, does not deviate from such perpendicularity by more than 20°. It should be understood that these definitions both are correct only in the web guiding situations to which the apparatus is applicable, i.e., where the web turns through 180° in passing over the guide roller or rollers, or is passed around the rollers in an S-wrap as hereinafter described.

Moreover, the pivotal axis containing the instant center of the guide rollers is maintained within a distance of the center line of the incoming span which does not exceed 25% of the distance between the planes of the entering and exiting web spans. A more specific and definite definition of this location of the instant center-containing pivotal axis is that at all times during the guiding motion of the roller or rollers, their instant center-containing pivotal axis should not move away from the longitudinal center of the initial roller contacted by the web by a distance which exceeds 25% of the distance between the planes of the entering and exiting web spans. The latter distance can also be defined as the distance separating two parallel planes extending tangent to the rollers at the opposite sides thereof. With this arrangement, displacement type guiding of the web (as opposed to steering type guiding) is achieved, and the span is twisted slightly about its central axis, but is not appreciably lengthened or stressed at either of its edges as compared to the stressing which occurs when using a steering type web guide of comparable size.

The permissible travel of the instant center-containing pivotal axis of the web guiding apparatus can also be defined without reference to the spans of the web. Thus, it is preferable that this pivotal axis be maintained within a distance of a point located (a) midway of the length of the first guide roller contacted by the web and (b) on the peripheral surface thereof first contacted by the web, which distance does not exceed 25% of the distance between two parallel planes extending tangentially to the points on the peripheral sides of the roller or rollers which are initially and finally contacted by the web as it passes thereover. In the case of a single roller, this latter distance is equivalent to the diameter of the roller. In the case of a dual roller arrangement this latter distance is equivalent to the distance between two parallel planes extending through the rotational axes of the two rollers and in a direction parallel to the pivotal axis of the framework supporting the rollers, as such framework is hereinafter described, plus the sum of the radii of the two rollers.

To more specifically describe the structure of the web guiding apparatus of the invention, a single guide roller or a pair of parallel guide rollers are provided, and where two are used, they are mounted for rotation about parallel axes. The roller or rollers are journaled in a framework which is pivotally supported on carrier blocks which are in turn slidably mounted on a suitable raceway assembly. A crank arm is pivotally connected between a point adjacent or on the raceway assembly and some point on the framework which rotatably journals the rollers so that sliding movement of the framework and carrier blocks on the raceway, coupled with a movement limiting function of the crank arm, results in the guide rollers and framework pivoting about a common instant center-containing axis which occupies the position described in the preceding paragraphs. The ends of the crank arm may be connected at various points on the raceway assembly and the framework, provided that the common pivotal axis (containing the instant center) does not depart from parallelism to, or coincidence with the plane of the incoming span by an angle of more than 20°, and does not move farther from the center line of the incoming span than 25% of the distance between the planes of the entering and exiting web spans. An alternative reference point which can be used in lieu of the center line of the incoming span in the identification of the location of the pivotal axis is the longitudinal center of that peripheral surface of the roller over which the incoming span initially passes which is first contacted by the web.

The described slider-crank type structure and the manner in which the guide rollers are pivoted with respect to the web permit several marked advantages to be achieved by the web guiding apparatus of this invention. In some previously used types of web guiding apparatus, the instant center is displaced by a distance equivalent to at least the width of the web in an upstream direction from the guide roller initially encountered by the web. Reference has already been made to the decrease in wrinkling or over-stressing of the web which is effected when the displacement type guiding attainable with the offset pivoted web guiding apparatus of the invention is utilized. Moreover, where the entering span is of limited length and does not have enough flexibility to permit the web to be distorted to any substantial extent, steering web guides of the type previously widely in use cannot be effectively employed, and a displacement web guide of the type contemplated by the present invention must be used if the web is to be effectively guided without constant attention. Finally, the slide and crank type mounting arrangement used, we believe, for the first time in an offset pivoted web guide, greatly facilitates the ease with which the guiding apparatus can be mounted. Only one base is required for mounting the guiding apparatus and no bending moment is imposed upon the pivot pin utilized in the apparatus where a 180° wrap of the web around the roller or rollers is used. Clevis type shackles and mounting arrangements with their attendant stability and accuracy problems are eliminated as a result of the in line, rigid mounting of the hydraulic drive cylinder which drives the framework pivotally supporting the rollers in sliding movement along the raceway assembly which is provided in the apparatus.

From the foregoing description of the invention, it will be apparent that the web guiding apparatus of the invention provides improved efficiency in the guiding of elongated continuous webs, particularly where the incoming span of the web is relatively short in length.

A further object of the invention is to provide a dual or single guide roller, offset pivoted web guiding apparatus which can be easily mounted in a variety of positions, and which requires only a single base for mounting. The web guiding apparatus further eliminates, or does not require, any clevis type connections to the guiding rollers when the guiding apparatus is mounted for operation.

An additional object of the present invention is to provide web guiding apparatus which does not overstress the web which it is utilized to guide, and which does not tear or wrinkle the web as much as web guiding devices of the type previously in use are generally inclined to do.

An additional object of the present invention is to provide a relatively compact, mechanically simple web guiding apparatus which is characterized in having a long and trouble-free operating life.

In addition to the foregoing described objects and advantages, other objects and advantages of the invention will become apparent from the following detailed description of the invention when considered in conjunction with the accompanying drawings which illustrate one embodiment of the invention.

In the drawings which illustrate a dual roller embodiment of the invention:

FIGURE 7 is a schematic illustration of the manner in which the web guiding apparatus of the invention is utilized with an S-wrap configuration of the web to be guided. A two-roller embodiment of the invention is used in the S-wrap arrangement.

Figures 1, 2:
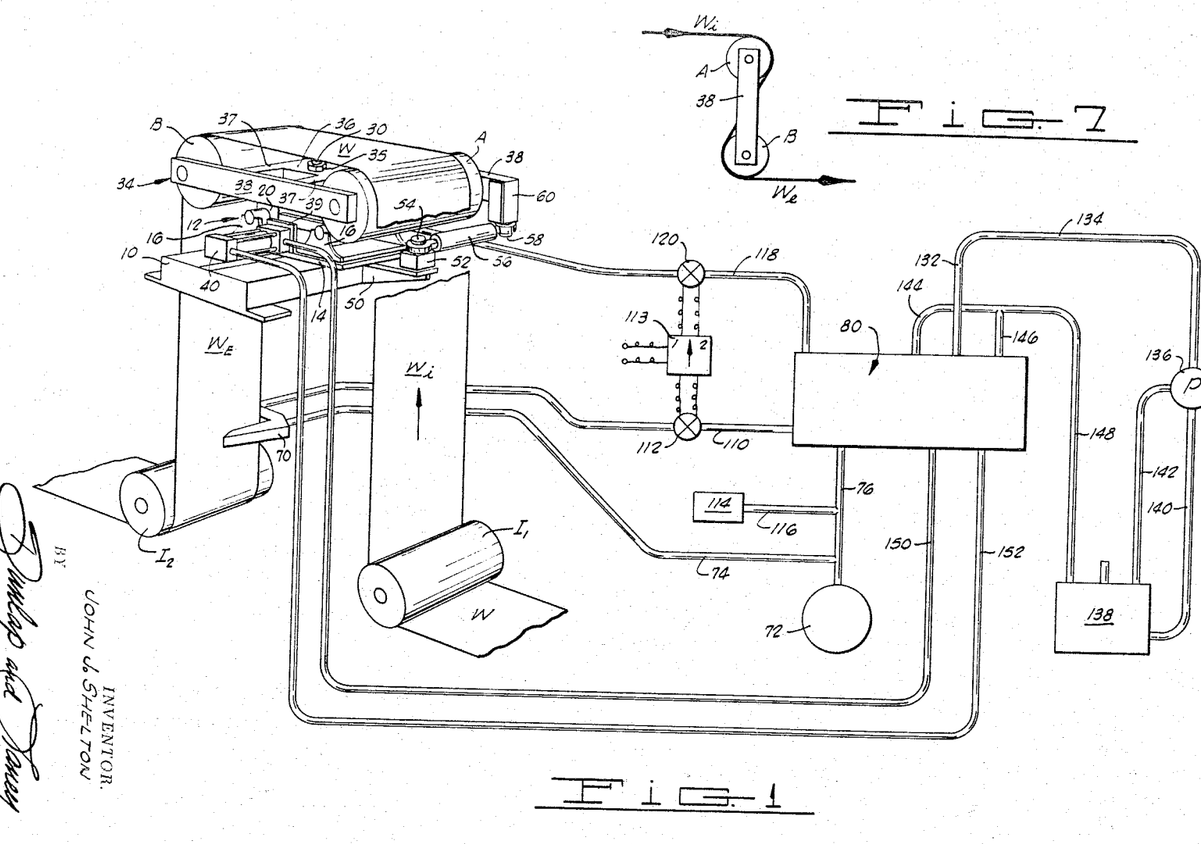
FIGURE 1 is a partially schematic, partially perspective view of an offset pivoted web guiding apparatus constructed in accordance with the present invention and illustrating one type of sensing head and control system which can be utilized conjunctively with the guide rollers of the apparatus. The guide rollers and the web which is passed over the guide rollers in a 180° wrap arrangement are illustrated in perspective, while the hydraulic control system utilized to move the guide rollers to correct web misalignment is illustrated somewhat schematically.
FIGURE 2 is a side elevational view of the offset pivoted web guiding apparatus of the invention in which a part of the crank arm used in the apparatus has been broken away to better illustrate the servo center valve used in the guide roller control system.
Figure 2:
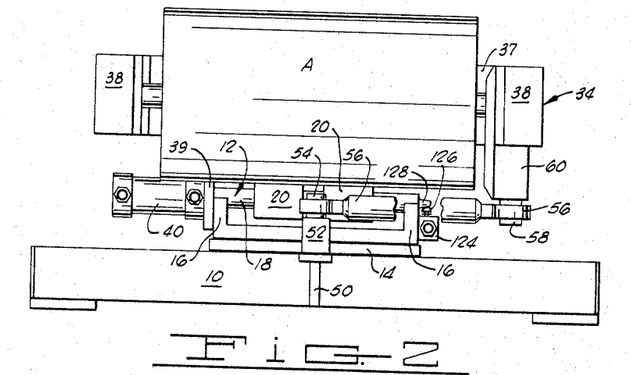
Figure 3:
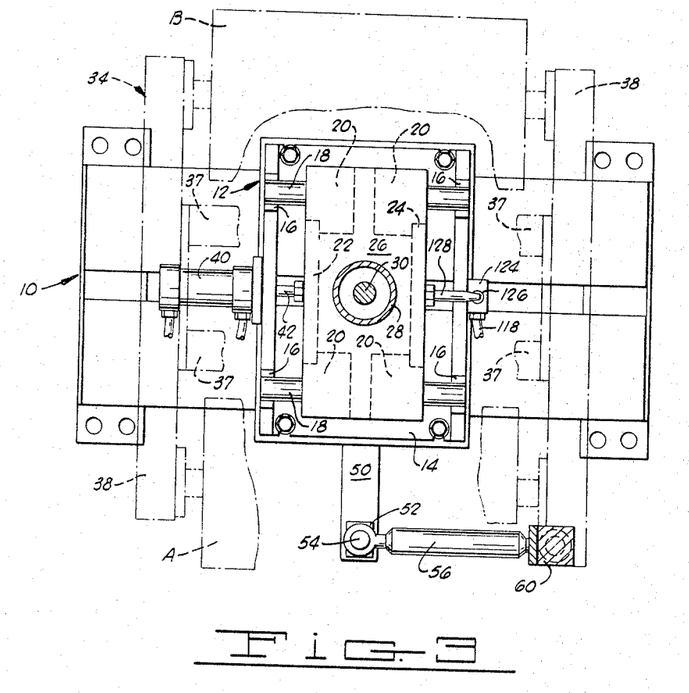
FIGURE 3 is a plan view of the raceway assembly, and of the roller supporting framework which is slidably mounted on the raceway assembly as these elements are utilized in the web guiding apparatus of the present invention. The positions of the guide rollers and the roller supporting framework are illustrated in dashed lines with portions of the guide rollers and framework being broken away to permit a better understanding of the arrangement of the elements of the invention.

Referring now to the drawings in detail, and particularly, to FIGURE 1, the mounting base upon which the offset pivoted guide roller assembly is mounted is designated by reference character 10 and supports a raceway assembly designated generally by reference character 12. The raceway assembly 12 comprises a race plate 14 which is provided at each end thereof with a pair of horizontally spaced, generally pyramidally-shaped rod support blocks 16. The rod support blocks 16 mounted at each end of the race plate 14 support a pair of elongated, parallel race rods 18. Two carrier blocks 20 are slidably mounted on each of the race rods 18 in axially spaced relation from each other therealong. The carrier blocks 20 which are opposed to each other at corresponding ends of the two race rods 18 are interconnected at one end of the rods by a tie plate 22, as best illustrated in FIGURES 2 and 3, and at the other end of the rods by a tie plate 24. The four carrier blocks 20 are also connected to each other by a large cross tie plate 26 which extends across the top of the carrier blocks and interconnects them in the manner best illustrated in FIGURES 3 and 4.

Figure 4:
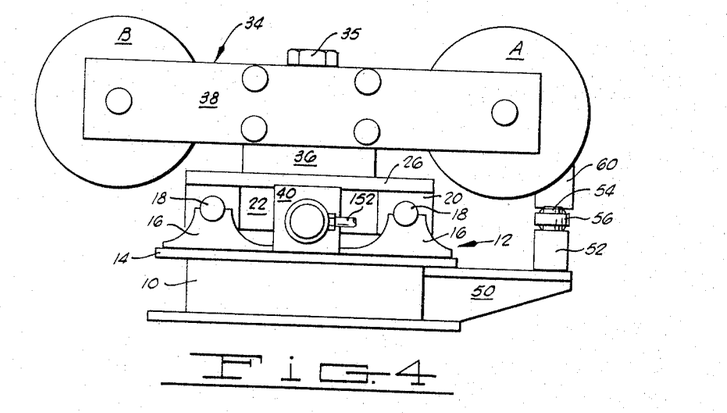
FIGURE 4 is an end elevational view of the web guiding apparatus of the invention.

Pivotally journaled in a bushing 28 disposed in the cross tie plate 26, and extending upwardly therefrom is a spindle bolt 30 which is secured at its upper end to a pivot framework designated generally by reference character 34. The upper end of the spindle bolt 30 is engaged by a nut 35 as best illustrated in FIGURES 1 and 4. It is to be noted that the spindle bolt 30 extends substantially normal to the plane containing the race rods 18.

The pivot frame 34 includes a central pivot carrier member 36 which surrounds and pivotally engages the spindle bolt 30, and which is secured to, or formed integrally with, a pair of parallel transverse cross members 37. The cross members 37 are secured at their ends to guide roller supporting frame members 38. The guide roller supporting frame members 38 extend parallel to each other and rotatably journal the ends of the shafts of a pair of parallel guide rollers A and B. The guide rollers A and B may be constructed in any of the ways conventional in the web guiding art, and may carry a cork, or other suitable surface, for gripping and engaging an elongated web W passed over and in contact with the rollers.

Located at one end of the raceway assembly 12 and supported by a mounting plate 39 is a double acting hydraulic cylinder 40. A piston (not seen) is mounted in the cylinder and carries a piston rod 42 which extends from the cylinder to the tie plate 22 to which it is secured. As will be hereinafter explained in greater detail, when the hydraulic cylinder 40 is energized so as to move the piston rod 42 outwardly from the cylinder, the effect of such movement is to cause the carrier blocks 20 to slide along the race rods 18 in a direction away from the hydraulic cylinder. When the fluid flow to the hydraulic cylinder 40 is reversed, the direction of movement of the carrier blocks 20 is reversed and they move toward the cylinder. The manner in which this movement is controlled by signals developed by a sensing head and associated equipment will be subsequently explained in greater detail.

For the purpose of imparting a swiveling or pivoting motion to the guide rollers A and B so as to move them about a pivotal axis oriented with respect to the web and the rollers in the manner hereinbefore described, an offset bracket 50 extends laterally from one side of the mounting base 10 and supports a journal block 52. A pivot pin 54 extends into the journal block and provides an anchor point for a crank arm 56 which is pivotally connected to the pivot pin 54. The opposite end of the crank arm 56 is connected to a second pivot pin 58 which is journaled in a journal block 60 rigidly connected to one of the roller supporting frame members 38. As will be hereinafter explained in greater detail, the function of the crank arm 56 and its associated connections to the mounting base 10 and to the guide rollers A and B is to cause the rollers to move in a swiveling or pivoting motion as they are reciprocated relative to the raceway assembly 12 when the hydraulic cylinder 40 is actuated.

In considering the type of swiveling or swinging movement imparted to the guide rollers A and B as a result of the inclusion in the apparatus of the crank arm 56, the meaning of the term "instant center" as it is understood in the art should initially be defined. If a rigid body, such as a guide roller, or such as two guide rollers mounted on, and moving with, a framework, undergoes curvilinear or arcuate motion in a plane, its motion can, at any instant, be considered to be pure rotation about a point known as the instant center. In other words, if the body were displaced a very small amount from the position under consideration, the body would move as though it were pivoted at the instant center. The instant center at any time during the swinging or arcuate movement can be found by extending radii perpendicular to lines drawn through spaced points in the body and extending tangentially to curved paths of movement of these two points at that time. Where the two radii intersect is the instant center of the body containing the two points.

It is to be noted that in the illustrated embodiment the instant center or point about which the guide rollers A and B will be pivoted or swiveled at any given instant in their guiding motion lies substantially in the axis of the pivot pin 54, and that this axis extends substantially parallel to, and is very nearly in the plane of the incoming web span $W_1$ as illustrated in FIGURE 1. Stated differently, the guide rollers will move in a plane which extends substantially normal or perpendicular to the exiting span $W_e$. Described in yet another way, in the illustrated embodiment the axis of pivotation containing the instant center extends substantially normal to a common plane containing the two axes of rotation of the guide rollers. The true pivotal axis containing the instant center of motion of the guide rollers A and B will not correspond to or coincide at all times with the axis of the pivot pin 54, but will instead be located somewhere along the projected axis of the crank arm 56 at the point where this projected axis intersects a line extended through the spindle bolt 30 and normal to the direction of movement of the spindle bolt 30 at any particular or given instant during the swiveling movement of the rollers. From this statement it will be apparent that the instant center will shift during the guiding motion of the rollers and will generally be located at different points at different times during such guiding motion. In accordance with the description of the location of the instant center and pivotal axis as hereinbefore set forth, it is desirable that the pivotal axis containing the instant center always remain substantially parallel to the plane of the incoming web span $W_1$, and that it not be displaced from the center line of this incoming span by a distance which is greater than 25% of the distance which separates the incoming and exiting spans designated by reference numerals $W_1$ and $W_e$ in FIGURE 1, respectively, or, to define its location without reference to the web, not be displaced from the longitudinal center of the outer or upstream peripheral surface of the lead roller by a distance exceeding 25% of the distance which separates two parallel planes extending tangentially to the extreme opposite sides of the rollers A and B. It will be perceived that, within these limitations, the particular disposition and arrangement of the crank arm 56 and the points of attachment of its opposite ends can be varied considerably from that shown in the illustrated preferred embodiment of the invention, and it is contemplated that all such modifications in mounting of the crank arm shall be included within and contemplated by the scope of this invention. Before proceeding further with the discussion, it should be pointed out that the web W is led over the guide rollers A and B from a pair of idler rollers $I_1$ and $I_2$ as depicted in FIGURE 1 to form a 180° wrap configuration or an S-wrap as depicted in FIGURE 7.

For the purpose of detecting departures of the web which is to be guided from the desired path of travel, and for developing the corrective signals and forces necessary to move the guide rollers A and B in a corrective motion so that the web may be maintained in proper alignment, a sensing head and hydraulic power system of the type depicted in FIGURE 1 may typically be employed. Although the type of sensing and power system depicted in FIGURE 1 includes a pneumatic sensing head and a hydraulic drive system, other types of sensing devices and power systems can be used equally effectively. These elements are therefore not considered to be a specific part of the present invention except as they are generally included in combination with the offset pivoted guide roller system as hereinbefore described.

In further explaining how the offset pivoted guide roller is actuated by the pneumatic sensing head and hydraulic drive system, reference will be made to the combination depicted in FIGURE 1 in which a pneumatic sensing head is indicated by reference character 70. The sensing head 70 is positioned adjacent and cooperates with the existing span $W_e$ of the web W, and is supplied with compressed air from a suitable supply of compressed air represented by reference character 72. The supply of compressed air 72 preferably comprises a positive displacement or vane type compressor capable of supplying a pulsating air pressure of relatively high frequency pulsations, such as the compressor shown in U.S. Patent 3,098,595. Pulsating air pressure is delivered via a conduit 74 to the intake port of the pneumatic sensing head 70, and by an air pressure manifold 76 to a main hydraulic servo valve 80. A servo valve of the type illustrated schematically in FIGURE 1 and designated by reference character 80 is illustrated and described in detail in U.S. Patent 3,098,595.

The servo valve 80 is entered by a conduit 110 which passes through a suitable electrically energized solenoid valve 112 to the pneumatic sensing head 70. A two-position electrical switch 113 is electrically connected to the solenoid valve 112. Reference character 114 designates an adjustable, constant pressure regulator which is connected to the manifold 76 by a conduit 116, and which functions to maintain the pressure within the manifold 76 at a selected average value. The pressure regulator 114 has a low frequency response so as not to attenuate the high frequency pressure pulsations developed by the positive displacement compressor 72. Its operation is more fully explained in U.S. Patent 3,098,595.

Yet another conduit which communicates with the servo valve 80 is the conduit 118 which passes through an electrically energized solenoid valve 120 and is connected to a servo centering valve 124 which is positioned at one end of the raceway assembly 12 and is best shown in FIGURES 2 and 3 of the drawings. The servo centering valve 124 has a valve stem 126 which projects therefrom and cooperates with an actuating rod 128 secured to an projecting from the tie plate 24 extending between the carrier blocks 20 as best illustrated in FIGURE 3. The purpose of the servo centering valve 124 will be explained in greater detail hereinafter.

A power fluid inlet conduit 134 is provided by which the servo valve 80 is supplied power fluid from a conventional hydraulic pump 136. The hydraulic pump 136 draws hydraulic fluid from a reservoir 138 through a hydraulic line 140. A return line 142 to the reservoir 138 is provided from the pump 136 so that when a substantial back pressure on the pump develops as a result of the complete closure of the servo valve 80, the pump can recycle to the reservoir 138. A pair of exhaust fluid conduits 144 and 146 are connected at one end to the servo valve 80 and at their other ends are connected via a conduit 148 to the hydraulic fluid reservoir 138. A pair of power fluid outlet conduits 150 and 152 are connected between the main servo valve 80 and the double acting hydraulic cylinder 40.

*Operation*

In setting up the offset pivoted web guiding apparatus of the present invention for utilization in maintaining the alignment of a moving web, the web is first threaded over the guide rollers A and B in the manner illustrated in FIGURE 1. Thus, the incoming span $W_1$ of the web W is passed around and over the roller, and is extended tangentially with respect to the periphery of the initial or lead roller A. The web is wrapped around the lead roller A so as to contact about 90° of the periphery thereof, and is extended from the lead roller A to the second guide roller B. Again, the web is extended around the guide roller B so as to contact about 90° of the periphery thereof. This type of web wrap which is illustrated in FIGURE 1 can be termed a 180° wrap. The guiding apparatus of the present invention can also be used effectively to guide an S wrap of the type illustrated schematically in FIGURE 7. The exiting span $W_e$ of the web W is inserted between the two legs of the sensing head 70 so that a jet or stream of air can be directed against the web at all times, and the sensing head operated in accordance with conventional practice.

The web W may be threaded over the rollers A and B in either a 180° wrap or an S wrap, and when the web guiding system of the invention is in either of two statuses. In one of these, the system is set for automatic guiding by switching the two-position electrical switch 113 to a position in which the solenoid valve 120 is closed so that no pneumatic pressure is delivered via the conduit 118 to the servo centering valve 124. In this position of the switch 113, the solenoid valve 112 is opened to permit the pneumatic pressure developed across the sensing head 70 to be transmitted as a static pressure through the conduit 110 into the main hydraulic servo valve 80. The magnitude of the pressure developed in the conduit 110 will then depend upon the position of the web W relative to the sensing head 70. In other words, the more of the air jet across the slot in the sensing head 70 which is intercepted or cut off by the web W, the lesser will be the pressure developed in the conduit 110 and transmitted to the main hydraulic servo valve 80. The manner in which the sensing head 70 functions in conjunction with the servo valve 80 is fully described in United States Patent 3,098,595.

The second, and the preferred, status of the web guiding system at the time of threading the web W over the guide rollers A and B is that in which the control switch 113 is shifted to a second position which effectively closes the solenoid valve 112 and opens the solenoid valve 120. This permits air pressure to be transmitted through the conduit 118 to the servo centering valve 124. At the same time, the sensing head 70 is effectively removed from the system since no pressure can be transmitted from the sensing head through the conduit 110 into the main hydraulic servo valve 80. Instead air is circulated from the manifold 76 through the main hydraulic servo valve 80 to the servo centering valve 124 and is there bled to the atmosphere.

The amount of air which is bled through the servo centering valve 124 is in turn determined by the degree to which the valve stem 126 is depressed by the actuating rod 128. The system is designed so that by proper preadjustment of the main servo valve 80 and proper control of the pressure in the manifold 76 by the pressure regulator 114, the fluid bled through the servo centering valve 124 may be made to be just sufficient to exactly position the main servo valve 80 in a position in which the web guiding rollers A and B will be exactly centered relative to the desired path of travel of the web W. In other words, the servo centering valve 124 is a device which functions to permit the rollers A and B to be precisely centered with respect to the desired path of travel of the web W so that the web may be threaded thereon at that time without the roller being constantly shifted in response to the changing position of the portion of the web which passes through the sensing head 70. The sensing head 70 is effectively isolated from the system, and the only pressure variation which affects the position of the web guiding rollers A and B is that which occurs as a result of the bleeding of air from the main servo valve 80 through the servo centering valve 124.

After the web has been passed around the guide rollers A and B, the control switch 113 is shifted to the automatic operating position in which the solenoid valve 120 is closed and the solenoid valve 112 is open. This effectively isolates the servo centering valve 124 from the system and establishes communication between the sensing head 70 and the main hydraulic servo valve 80. As the lateral edge of the exiting span $W_e$ of the web moves transversely in the slot in the sensing head 70, it passes through, or partly into, the air jet developed across the sensing head by the pressurized air delivered from the conduit 74 and received by the conduit 110. The magnitude of the pressure developed in the conduit 110, and therefore the pressure developed in the main servo valve 80, depends upon the degree to which the web W intercepts the air jet passing across the slot in the sensing head 70.

The main servo valve 80 may be in any one of three statuses, depending upon the air pressure developed in the conduit 110, which is in turn determined by the position of the web W relative to the sensing head 70. In one of these, which may be termed the neutral position, the web is aligned in its desired path of travel and intercepts a sufficient portion of the air jet across the sensing head 70 that the main servo valve 80 is "neutrally" positioned. Hydraulic fluid introduced to this valve at this time via the conduit 134 is merely recirculated through conduits 144 and 146 to the reservoir 138. Since no hydraulic power fluid is passed through the power fluid outlet conduits 150 and 152, no actuation of the hydraulic cylinder 40 occurs. The equalization of hydraulic pressure on opposite sides of the piston in the hydraulic cylinder 40 results in the piston being centered in its cylinder, and in the carrier blocks 20 being centered on the race rods 18. The guide rollers A and B are thus centrally positioned with respect to the web W and are not canted or angled with respect to the idler rollers $I_1$ and $I_2$ and do not impart any twist or torque to either the incoming or exiting web spans $W_i$ and $W_e$, respectively. The described alignment of the guide rollers A and B will persist as long as the web W moves in the predetermined desired path of travel and does not shift laterally from such path in either direction.

When the web commences to shift from the desired predetermined path of travel under external influences, such as vibration, air currents, or other forces well known to those skilled in the art, the lateral edge of the exit span $W_e$ is also shifted relative to the pneumatic sensing head 70 which is fixed in its position. As the lateral edge of the web W moves farther into or out of the air jet across the slot in the sensing head 70, the pressure prevailing in the conduit 110 is altered, thus causing an increase or decrease in the pressure transmitted to the main hydraulic servo valve 80.

If, for example, the web W moves to the right, as viewed in FIGURE 1, the exiting span of the web W moves to the right, and thus moves farther into the slot in the sensing head 70. A greater obstruction of the air jet across the sensing head 70 occurs with the result that the pressure in the conduit 110 is decreased. The decrease in pressure in the conduit 110 causes a corresponding decrease in the pressure transmitted to the main hydraulic servo valve 80. The valve 80 thus is caused to shift to a second status or position in which hydraulic power fluid entering the valve from the conduit 134 is diverted by the valve into the power fluid outlet conduit 150. Hydraulic fluid is thus directed through the conduit 150 to the inner end of the hydraulic cylinder 40 so that the piston rod 42 is caused to move to the left or into the cylinder. Movement of the piston rod 42 to the left is accompanied by discharge of hydraulic fluid through the return conduit 152 to the main hydraulic servo valve 80 and results in the slidably mounted carrier blocks 20 being moved toward the left as viewed in FIGURE 1. This movement of the carrier blocks 20 on the race rods 18 in turn causes the roller-carrying framework 34 to be shifted to the left. As the framework 34 is moved toward the left, it is caused to swivel or pivot on the spindle bolt 30 by the motion-limiting effect of the crank 56. The net effect is that the guide rollers A and B simultaneously move toward the left side of the web W and pivot about a pivotal axis which contains the instant center of rotation. Actually, the lead roller A undergoes very little bodily motion, but rather tends to pivot counterclockwise about a pivotal axis which, though shifting slightly as the guide rollers undergo movement, tends to remain substantially parallel to the incoming span $W_i$ of the web W and relatively close to the center line of the span. Because of this position of the axis of pivotation of the guide rollers A and B, and of the framework which pivotally supports them, very little stressing or tensioning of the web W occurs, but rather it is bent about its center line as an axis of bending and is not elongated appreciably at either edge. The guiding effect which is obtained is thus a displacement type of guiding rather than steering guiding of the type obtained when the instant center of the moving guide rollers is displaced a substantial distance along the incoming web span from the lead roller and the entering span $W_i$ is not parallel to the axis of pivotation.

Due to the fact that the plane in which the guide rollers A and B move is substantially perpendicular to the entering and exiting spans (stated differently, the pivotal axis is substantially parallel to or coincident with the plane of the entering span), the elongation of the edges of the web is very small. Substantially all of the corrective guiding of the web is accomplished in the included span between the points of tangency of the web to the guide rollers.

As the web W moves outwardly in the slot in the sensing head 70, it presents less interference with the air jet across the sensing head slot so that the pressure in the conduit 110 is increased. The increase in the pressure in the conduit 110 causes the main hydraulic servo valve 80 to move to the neutral position with the result that discharge of hydraulic fluid to both of the conduits 150 and 152 is stopped, and the piston in the hydraulic cylinder 40 is arrested when it has arrived at its proper position as dictated by the sensing head 70. The web guiding rollers A and B will therefore cease their movement, and the web W will remain in its realigned position until such time as other external influences tend to move it out of alignment with its predetermined path of travel and thus further into or out of the slot in the sensing head 70.

If the web W becomes misaligned by movement in the direction which moves its lateral edge outwardly in the slot in the sensing head 70, the corrective action which occurs is the opposite of that which has been described for misalignment tending to move the web inwardly in the slot in the sensing head. In other words, the main hydraulic servo valve 80 is shifted to a position which permits hydraulic fluid to be delivered from the pump 136 to the conduit 152 which in turn delivers the fluid to the hydraulic cylinder 40. The piston rod 42 is thus moved to the right, pushing the carrier blocks 20 and causing the guide roller framework 34 to be moved to the right or toward the sensing head 70. In this manner, the movement of the web toward the left or outwardly in the slot in the sensing head is offset by the movement of the guide rollers A and B when the web is returned to its aligned position.

Figure 5:
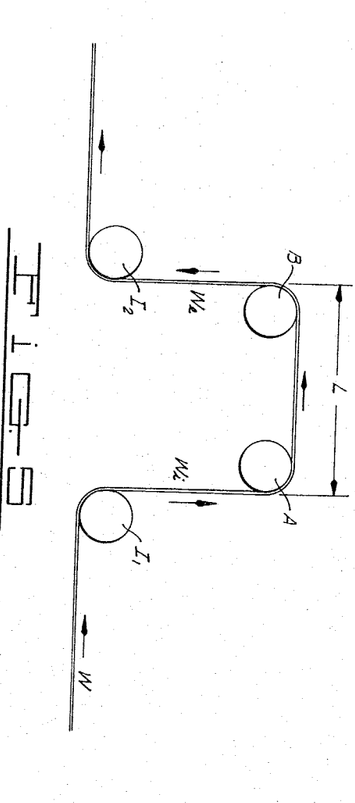
FIGURES 5 and 6 are schematic illustrations of the guide rollers and certain idler rollers utilized in the invention, as these rollers appear in their relationship to the web which is being guided.
Figure 6:
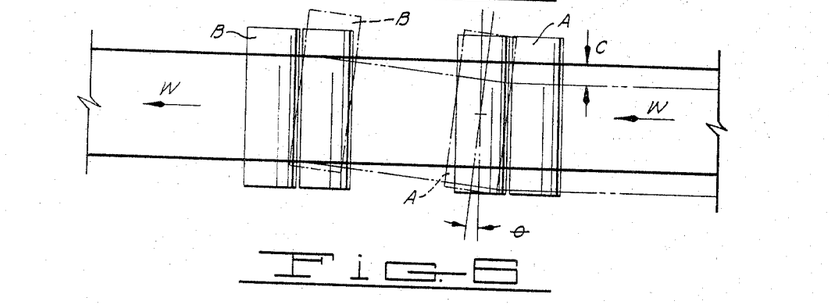

Reference is made to FIGURES 5 and 6 to complete the description of the invention, and to further clarify the manner in which the offset pivoted web guiding apparatus functions to effectively correct web misalignment. The two idler rollers $I_1$ and $I_2$ are positioned below the guide rollers A and B, and the web wrap arrangement illustrated in FIGURES 5 and 6 is a 180° wrap. The nomenclature employed in expanding the action of the guide rollers A and B in correcting web misalignment is as follows:

C=Correction, inches
L=Length of guide span, inches
θ=Guide angle, degrees

In FIGURE 6, the solid lines are used to represent the lateral edges of the web when it is in an aligned position, while the broken or dashed lines are used to represent the lateral edges of the web when the web is in a misaligned position and is undergoing correction. It is to be noted that the exiting span of the web is at all times aligned in the same position in the two depicted situations. In other words, the pivotation of the guide rollers A and B, function in the alternate situation represented by the dashed lines, to correct the path of travel of the web so that it is still aligned as desired in the exiting span.

As the web shifts to one side or the other from the desired path of alignment (say, toward the bottom of the page of drawings as illustrated in FIGURE 6 to the misaligned position represented by the dashed lines), the sensing head 70 which cooperates with the exiting or downstream span of the web senses the misalignment, transmits a signal through the hydraulic system as hereinbefore described and causes the hydraulic cylinder 40 to shift the guide rollers A and B to the dashed line positions illustrated in FIGURE 6. The effect of this shifting movement of the rollers A and B is to cause the web to be bent, or its course changed, over the distance of the guide span L between the entering span $W_i$ and the exiting span $W_e$.

The amount by which the path of travel will be corrected, C, is determined by the relationship $C = L \cdot \sin \theta$. Thus the amount of correction effected is directly related to the guide angle $\theta$ and to the length L of the guide span in inches. With a greater distance separating the two rollers A and B, a smaller corrective guide angle will be required in order to correct or compensate for a given error in the incoming span $W_1$.

From the foregoing description of the invention it will have become apparent that the invention provides an improved offset pivoted web guiding assembly which can effect rapid and accurate correction of a moving web to maintain its travel in conformity with a predetermined path of movement. The apparatus which is employed is compact and can be easily mounted in a variety of locations. Only a single base is required, and all clevis type linkages are eliminated. Moreover, in guiding with the apparatus of the invention, the web is not stretched or over-stressed, and is retained in substantially the same shape despite a substantial amount of roller movement in maintaining the web in alignment.

Although specific details of the structure included in the present invention have been set forth in the foregoing description, it is anticipated that various modifications and innovations in the structure can be effected without departure from the basic principles which underlie the invention. All such modifications and innovations are deemed to be circumscribed by the spirit and scope of the invention except as the same may be necessarily limited by the appended claims or reasonable equivalents thereof.

I claim:
1. Web guiding apparatus comprising:
   at least one rotatably mounted guide roller;
   raceway assembly means;
   at least one carrier block slidably mounted on said raceway assembly means for reciprocation on said raceway assembly means;
   framework means rotatably journaling said roller and pivotally mounted on said carrier block; and
   a crank arm connected between said raceway assembly means and said framework means for causing said framework means and the roller carried thereby to pivot about the pivotal axis of said framework means on said raceway assembly means as said carrier block reciprocates on said raceway assembly means.

2. Web guiding apparatus as claimed in claim 1 wherein said crank arm is of a length and extends in a direction such that the instant center-containing common pivotal axis of said guide roller and framework means extends at all times perpendicular to the plane in which the rotational axis of said guide roller is caused to pivot or swivel and extends tangentially to the periphery of said guide roller at a point disposed in the longitudinal center of said guide roller on the side thereof initially contacted by said web as said web is passed thereover.

3. Web guiding apparatus for guiding a moving web comprising:
   a pair of spaced guide rollers rotatable about spaced, parallel axes;
   raceway assembly means;
   at least one carrier block slidably mounted on said raceway assembly means for reciprocation on said raceway assembly means;
   framework means rotatably journaling said rollers and pivotally mounted on said carrier block for pivotation about an axis extending substantially perpendicular to the planes containing the rotational axis of each of said rollers;
   bracket means extending from said assembly means; and
   a crank arm pivotally connected at one of its ends to said bracket means for pivotation about an axis extending parallel to the instant center-containing pivotal axis of the guide rollers as hereinafter defined, and connected at its other end to said framework means, said crank arm being of a length and in a position such that said guide rollers and framework means pivot together about an instant center-containing common axis extending at all times substantially perpendicular, or within an angle of 20° from perpendicularity, to the planes in which the rotational axes of said guide rollers move as said framework is pivoted about its pivotal axis on said carrier block, and said instant center-containing common axis passing within a distance within the longitudinal center of the peripheral surface of one of said guide rollers which is first to be contacted by said web which does not exceed 25% of the distance separating two parallel planes extending tangentially to the rollers at opposite sides thereof.

4. Web guiding apparatus as claimed in claim 3 wherein said raceway assembly means comprises:
   a mounting base;
   a race plate mounted on said mounting base;
   rod supporting blocks on said race plate; and
   at least one race rod supported by said supporting blocks and passed slidingly through said carrier block.

5. Web guiding apparatus as claimed in claim 4 wherein said bracket means includes:
   a bracket extending from said mounting base in a direction normal to the direction of extension of the axes of rotation of said guide rollers and approximately midway of the length of said race rods; and
   a journal block secured to said bracket and pivotally journaling said crank arm.

6. Web guiding apparatus as claimed in claim 3 wherein a plurality of carrier blocks are slidably mounted on said raceway assembly means, and further characterized to include
   a cross tie plate extending between and interconnecting said carrier blocks, and
   bearing means pivotally journaled in said cross tie plate and connected to said framework means to pivotally mount said framework means.

7. Web guiding apparatus as claimed in claim 3 wherein said framework means comprises:
   a central pivot carrier member pivotally connected to said carrier blocks;
   at least one transverse cross member extending from said central pivot carrier member in a direction parallel to the rotational axis of said guide rollers; and
   guide roller supporting frame members connected to the opposite ends of said transverse cross member.

8. Web guiding apparatus as claimed in claim 3 wherein said crank arm is of a length and extends in a direction such that the instant center-containing common pivotal axis of said guide rollers and framework means extends at all times perpendicular to a common plane containing both rotational axes of said guide rollers and extends tangentially to the periphery of one of said guide rollers at a point disposed in the longitudinal center of said one guide rollers on the side thereof most remotely located with respect to the second guide roller.

9. Apparatus for displacing a moving web from an undesirable position of misalignment to desired position of alignment comprising:
   (a) raceway assembly means;
   (b) at least one carrier block slidably mounted on said raceway assembly means for reciprocating movement therealong;
   (c) framework means pivotally supported on said carrier block and reciprocably movable with said carrier block;
   (d) a pair of guide rollers journaled on said framework means for rotation about spaced, parallel axes of rotation;
   (e) means for reciprocating said carrier block on said raceway assembly in response to the movement of said web to said undesirable position of misalignment; and (f) mechanical crank linkage means connected between said raceway assembly and said framework means for swinging said framework means and the guide rollers journaled thereon through a substantially monoplanar curved path, as said carrier block is reciprocated, the several increments of said curved path each having a radius of curvature orignating at a point disposed within a distance from the longitudinal center of the outer peripheral surface of one of said rollers which does not exceed 25% of the fixed distance between two parallel planes extending tangent to the rollers at the opposite sides thereof.

10. Apparatus for displacing a moving web as claimed in claim 9 wherein said means for reciprocating said carrier block comprises:

hydraulic cylinder means including a piston connected to said carrier block;

means adjacent said web for sensing the movement of said web in a lateral direction; and control means responsive to said sensing means for introducing hydraulic power fluid to said hydraulic means so as to oppose undesirable lateral movements of said web.

11. Apparatus for displacing a moving web as claimed in claim 10 wherein said raceway assembly means includes a flat mounting plate; and elongated race rods mounted on said mounting plate and slidingly supporting said carrier blocks, said race rods extending parallel to the axes of rotation of said guide rollers, and said hydraulic cylinder means being disposed in line with said race rods so that said piston reciprocates in a line which is parallel to said race rods and the rotational axes of said guide rollers.

12. Apparatus for displacing a moving web as claimed in claim 9 wherein said raceway assembly means comprises an elongated race rod slidably supporting each of said carrier blocks and extending parallel to the rotational axes of said guide rollers.

13. Apparatus for displacing a moving web as claimed in claim 9 wherein said crank linkage means comprises:

a bracket secured to said raceway assembly means;

a journal block secured to said bracket;

a pivot pin extending into the journal block;

a crank arm connected at one of its ends to, and extending from, the pivot pin;

a second journal block on said framework means and disposed closer to the ends of said guide rollers than to the center thereof; and a second pivot pin journaled in said second journal block and connected to the other end of said crank arm.

14. Apparatus for maintaining the alignment of a moving web comprising:

(a) raceway assembly means;

(b) carrier blocks slidably mounted on said raceway assembly means for reciprocating movement therealong;

(c) framework means pivotally supported on said carrier blocks for pivotation about an axis extending substantially perpendicular to the plane of reciprocation of said carrier blocks and reciprocably movable with said carrier blocks whereby said framework means can be reciprocated and pivoted in substantially the same plane;

(d) a pair of guide rollers journaled on said framework means for rotation about spaced, parallel axes of rotation;

(e) means for reciprocating said carrier blocks on said raceway assembly means in response to the movement of a web which is in contact with both of said rollers in a direction lengthwise of one of said guide rollers; and (f) an elongated crank arm having one of its ends fixed by a pivotal connection to said raceway assembly means and having its other end pivotally connected to said framework means at a point closer to the ends of said guide rollers than the fixed end of said crank arm, the direction of extension of said crank arm being such that when said framework means is in the center of its path of reciprocation on said raceway assembly means, said crank arm extends along a first line which is perpendicular to a second line extending normal to a plane containing the axes of rotation of said guide rollers and which extends tangentially to the periphery of one of said guide rollers at a point disposed in the longitudinal center of said one guide roller and on the side thereof most remotely located with respect to the second guide roller.

15. Apparatus as claimed in claim 14 wherein said framework means is supported on said carrier blocks for pivotation about an axis extending substantially perpendicular to the plane containing the rotational axes of said guide rollers and parallel to the instant center-containing axis of pivotation of said guide rollers and framework.

16. Apparatus as claimed in claim 15 wherein said raceway assembly comprises:

a mounting base;

a race plate mounted on said mounting base;

rod supporting blocks on said race plate; and a pair of parallel race rods supported by said supporting blocks and passed slidingly through said carrier blocks.

17. Apparatus as claimed in claim 15 wherein said means for reciprocating said carrier blocks comprises:

a tie plate interconnecting said carrier blocks;

hydraulic cylinder means including a piston connected at one end of said tie plate;

a sensing head adapated to cooperate with said web for sensing misalignment of the web; and hydraulic control means responsive to said sensing head for introducing hydraulic power fluid to said hydraulic cylinder means.

18. In combination with an elongated web, apparatus for guiding the web as it moves in the direction of its longitudinal axis comprising:

a first roller having the web wrapped therearound over at least about 70° of arc of its periphery;

a second roller spaced from said first roller and mounted for rotation about an axis extending parallel to the axis of rotation of said first roller, said second roller having the web extended thereto from said first roller and wrapped therearound over at least 90° of arc of its periphery, the entering span of the web approaching said first roller and the exiting span of the web leaving said second roller lying in planes which extend substantially parallel to each other;

framework means rotatably journaling said first and second rollers;

raceway assembly means;

reciprocating means slidably mounted on said raceway assembly means for reciprocation therealong and pivotally supporting said framework means for pivotation about an axis extending substantially parallel to the entering and exiting spans of said web;

piston means for reciprocating said reciprocating means on said raceway assembly means; and an elongated crank arm having one of its ends pivotally supported for pivotation about an axis which is fixed relative to said raceway assembly means and which extends substantially parallel to the pivotal axis of said framework means on said reciprocating means, said crank arm having its other end pivotally connected to said framework means at a point such that when said reciprocating means is substantially centrally located in its path of reciprocation on said raceway assembly means, said elongated crank arm extends in a line which is perpendicular to a line extending parallel to the entering span of said web and displaced from the center line of said entering web by a distance not exceeding 25% of the distance between the entering and exiting spans of said web.

19. The combination claimed in claim 18 wherein said raceway assembly means includes at least one elongated race rod extending parallel to the plane containing the axes of rotation of said first and second rollers; and said reciprocating means includes a carrier block slidably mounted on each of said race rods for reciprocating movement therealong.

20. The combination claimed in claim 18 wherein the instant center-containing pivotal axis of said first and second rollers and said framework lies in the plane of said entering span of the web.

References Cited

UNITED STATES PATENTS

| | | | |
|---|---|---|---|
| 2,724,492 | 11/1955 | Kolbe | 198—202 |
| 2,989,265 | 6/1961 | Selsted | 226—21 X |
| 3,078,021 | 2/1963 | Crownfield | 226—21 |

M. HENSON WOOD, JR., *Primary Examiner.*

R. A. SCHACHER, *Assistant Examiner.*